United States Patent
Strumolo et al.

(10) Patent No.: US 6,529,860 B1
(45) Date of Patent: *Mar. 4, 2003

(54) PARTICLE IMPACT AND SOIL DEPOSITION ANALYSIS SYSTEM AND METHOD FOR VEHICLE DESIGN

(75) Inventors: Gary Steven Strumolo, Beverly Hills, MI (US); Viswanathan Babu, Farmington Hills, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,268

(22) Filed: Oct. 19, 1998

(51) Int. Cl.[7] .............................. G06G 7/48; G06G 7/50
(52) U.S. Cl. ................................................ 703/8; 703/9
(58) Field of Search ....................... 395/500.29, 500.3; 703/8, 9

(56) References Cited

U.S. PATENT DOCUMENTS

| | | | |
|---|---|---|---|
| 4,809,202 A | 2/1989 | Wolfram | |
| 4,928,580 A | * 5/1990 | McIntyre et al. | 98/2.1 |
| 5,432,718 A | 7/1995 | Molvig et al. | |
| 5,455,780 A | 10/1995 | Nguyen et al. | |
| 5,537,641 A | 7/1996 | da Vitoria Lobo et al. | |
| 5,568,404 A | * 10/1996 | Strumolo | 395/500.29 |
| 5,594,671 A | 1/1997 | Chen et al. | |
| 5,640,335 A | 6/1997 | Molvig et al. | |
| 5,649,064 A | 7/1997 | Jorgensen et al. | |
| 5,751,607 A | 5/1998 | Ohta | |

OTHER PUBLICATIONS

Web article "*CFD Solutions for Automotive Design*" 1997, Fluent Inc. http://www.fluent.com/applicat/auto/examples/auto.htm.

*Atomization and Spray Technology*, as modified Sep. 9, 1998 at www.icpet.nrc.ca/projects/atome.html 3 pages only.

FLUIDEX abstract 0379502 & Proceedings ImechE D, Journal of Automobile Engineering, 210 D4/–(327333), 1996, Ghannam M and Schumack M. "*A Model for automotive windshield washer spray delivered by a fluidic nozzle*" N.b. abstract only.

\* cited by examiner

*Primary Examiner*—Hugh Jones
(74) *Attorney, Agent, or Firm*—David B. Kelley

(57) ABSTRACT

A method and system for aiding in the design of an automotive vehicle enables dynamic placement of particle injection points relative to a computer aided design model representative of the vehicle to permit visual observation and alteration of resulting particle trajectories with respect to the model. Various particle trajectories, representing stones ejected from a tire toward the vehicle surface, soil deposition patterns, and the like can be simulated relative to the vehicle surface to evaluate a vehicle design, compare alternate designs and compare results from physical aerodynamic tests to predicted results.

20 Claims, 7 Drawing Sheets

FIG. 6

PARTICLE IMPACT AND SOIL DEPOSITION ANALYSIS SYSTEM AND METHOD FOR VEHICLE DESIGN

FIELD OF THE INVENTION

The present invention relates to computer aided vehicle design in general, and more specifically to a method and system for computer aided vehicle to design using particle impact and soil deposition analysis.

BACKGROUND OF THE INVENTION

There are numerous computer related tools which can facilitate the design and testing of automotive vehicles, including generalized software programs such as computer aided engineering (CAE), computer aided design (CAD), and computational fluid dynamics (CFD). These tools are typically used to investigate many issues related to vehicle design, including vehicle durability, vehicle performance, and vehicle aerodynamics. Heretofore, limitations on computer speed and algorithm accuracy have inhibited the development of a particle trajectory analysis tool in which several exterior aerodynamic design issues can be studied. For example, soil deposition on a vehicle panel due to tire rotation is a well known phenomena. A major obstacle in the past in investigating this, as well as other exterior aerodynamic issues, has been the inability to accurately calculate an external flow field around the vehicle.

However, with the advent of new and improved CFD technology, an accurate external flow field can now be calculated, thus making a particle trajectory analysis tool technically possible. A further need exists, nonetheless, for a method and system which utilizes available computer related technology to provide a user accessible particle trajectory analysis tool to aid in vehicle design. Additionally, a method and system is needed to provide a comparison between results from physical aerodynamic tests and a particle trajectory analysis tool, and to compare alternate vehicle designs.

SUMMARY OF THE INVENTION

The present invention addresses the deficiency in the field by providing a method and system for aiding in the design of an automotive vehicle enables dynamic placement of particle injection points relative to a computer aided design model representative of the vehicle to permit visual observation and alteration of resulting particle trajectories with respect to the model. Various particle trajectories, representing stones ejected from a tire toward the vehicle surface, soil deposition patterns along the bottom of vehicles, and the like can be simulated relative to the vehicle surface to evaluate a vehicle design, compare alternate designs and compare results from physical aerodynamic tests to predicted results.

The system of the present invention preferably comprises particle injector placement code operable with the user input means, such as a mouse, to effect a desired placement of at least one particle injector on the display with respect to a desired portion of a CAD model of the vehicle. Trajectory determination code means are included for computing at least one trajectory for a particle stream emanating from the at least one particle injector relative to the desired portion of the CAD model for a predetermined set of particle characteristics in a predetermined set of particle external conditions. The system also includes trajectory display code means for affecting display of the at least one trajectory with respect to the desired portion of the CAD model.

A method of the present invention comprises the steps of preparing a CAD model of the desired portion of the vehicle, placing a particle injector at a desired location with respect to the desired portion of the vehicle, specifying a set of particle information describing particles to be ejected from the particle injector, computing a stationary trajectory for a particle stream emanating from the particle injector, displaying the stationary trajectory relative to the desired portion of the vehicle on a display means to permit visual observation thereof, and repositioning the particle injector if necessary to achieve a desired stationary trajectory.

An advantage of the present invention is a method and system which permits modification of vehicle design based upon computed particle trajectories with respect to a CAD model of the vehicle.

Another advantage of the present invention is a method and system for aiding in vehicle design by enabling dynamic placement of particle injection points into a flow domain to permit visual observation and alteration of resulting particle trajectories with respect to a CAD model representative of the vehicle.

Still another advantage of the method and system of the present invention is a software program which allows a user to specify various characteristics of stones ejected from a tire patch to evaluate stone impact location and severity.

Another advantage is a software program for evaluating vehicle lower panel design relative to a stone and soil ejection from a vehicle tire.

Yet another advantage of the present invention is a method and system which provides a software program which can predict streaking along the bottom sides of a vehicle design caused by soil thrown from the tires.

Yet still another advantage is a software program which can predict soil deposition patterns from a vehicle tire and evaluate modifications to a vehicle design to minimize such streak patterns.

BRIEF DESCRIPTION OF THE DRAWINGS

These and other objects, advantages, and features of the present invention will be apparent to those skilled in the art upon reading the following description with reference to the accompanying drawings, in which:

FIG. 6 is a screen view of a dialog window for locating a tire injection patch and for defining trajectory conditions;

DETAILED DESCRIPTION OF THE PREFERRED EMBODIMENT

Figure 1:
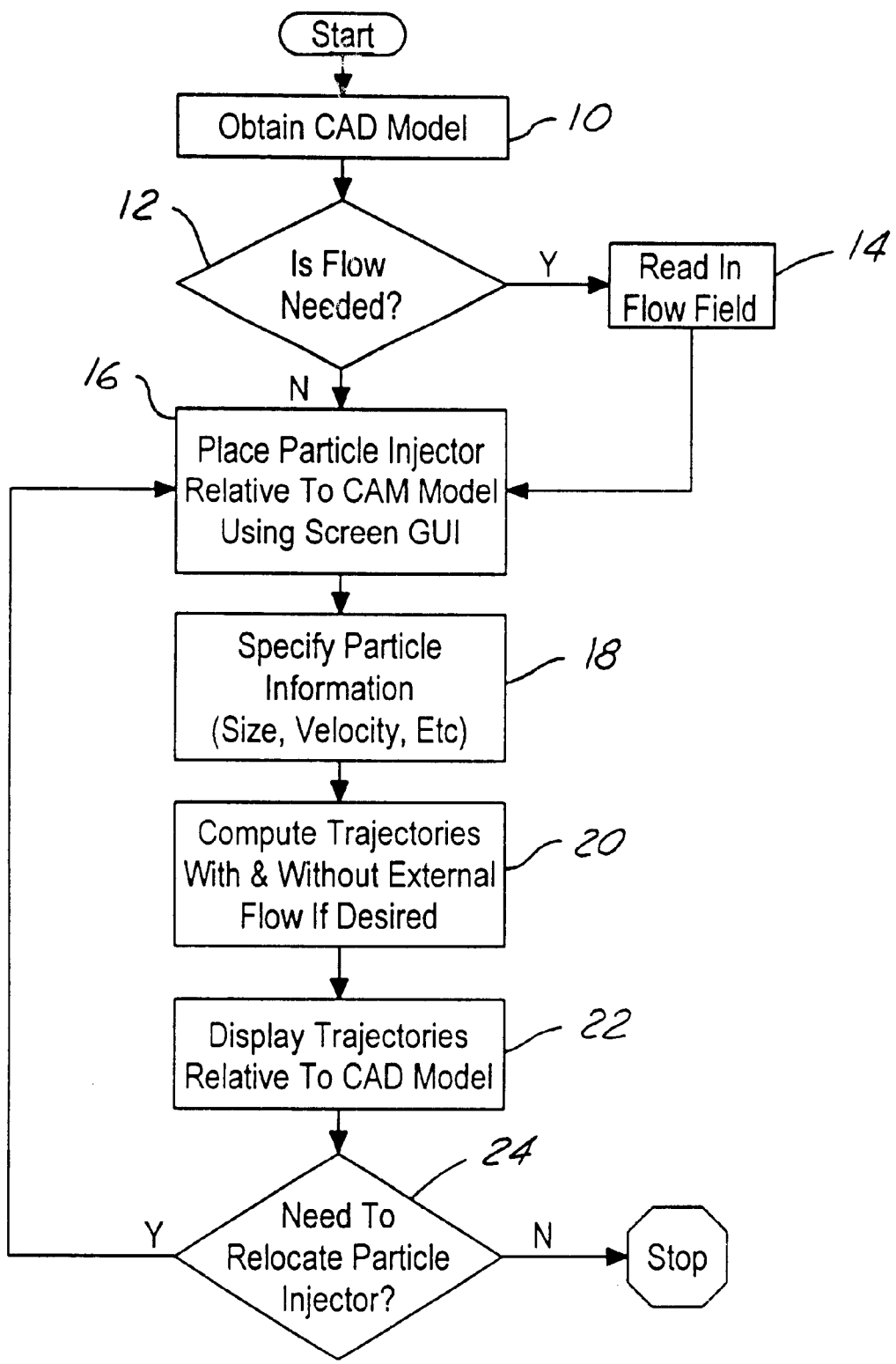
FIG. 1 is a flowchart of a method to aid in designing an automotive vehicle using particle trajectory analysis according to the present invention.

Turning now to the drawings, and in particular to FIG. 1 thereof, a flow chart of the method of the present invention is shown to aid in designing an automotive vehicle using particle trajectory analysis by enabling dynamic placement of particle injection points relative to a computer aided design (CAD) model representative of a portion of a vehicle with and without an external flow thereover. The present invention is intended to be carried out on a computer system which includes a computer having a memory, a processor, a display means, and user input means, such as a mouse or keyboard, as further described below. In box 10 of FIG. 1, a CAD model of a vehicle, or a desired portion of a vehicle, is obtained from an electronic storage device, such as a computer file stored on a server memory, the memory of the computer, a magnetic disk storage device, or any one of numerous other electronic or magnetic storage devices. The CAD model is preferably displayed, as is known in the art, on the display means, which can be, for example, a video display screen. Next, in diamond 12, an option is given to use a computed external flow over the CAD model, for example, representative of vehicle aerodynamics due to movement through the ambient. If flow is desired, then a predetermined flow field is read in from an external source, for example, a stored computer file, as shown in box 14. The external flow field may be computed by various commercial software programs, for example, PowerFlow™. This external flow field is computed relative to the exterior surface of the CAD model obtained in box 10.

If it is determined that flow is not needed in diamond 12, flow is routed to box 16 where a simulated particle injector is placed relative to the CAD model, box 16 (FIG. 1), to which the method is routed after reading in the flow field from box 14. The particle injector is preferably located using an on-screen graphical user interface (GUI), in cooperation with the user input means, preferably a mouse device known in the art. The screen GUI and mouse device permit a user to easily and dynamically place the particle injector at a desired location relation to the CAD model. It should be understood that more than one particle injector may be located relative to the CAD model and that particle trajectories emanating therefrom may be calculated and simultaneously displayed, as further discussed below.

In box 18, information is specified about the particles which are simulated to be ejected from the particle injector. This information may include, for example, particle size, particle velocity exiting the particle injector, particle density, and other information describing particle characteristics (FIG. 1). It should be understood that the particle information of box 18 need not be input in the order shown in FIG. 1 but may be provided at any step of the method prior to computation of particle trajectories in box 20. The trajectories are computed according to known physical principles as further described below, and may be computed with or without the external flow field (box 20).

After the particle trajectories have been computed, they are displayed relative to the CAD model (box 22, FIG. 1). Various options for display of the particle trajectories may be chosen, as further described below, and an on-screen GUI may be used to ease user selection from among the display options.

Finally, the user is given an option to dynamically relocate the particle injector, preferably using the screen GUI, in order to assess the performance of a new vehicle design, or to compare alternate vehicle designs, or to compare results from physical aerodynamic tests and a particular vehicle design (box 24, FIG. 1).

In the present invention, the trajectories of particles of a given diameter and given initial velocity can be predicted (box 20, FIG. 1) as they move through a three-dimensional (3D) flow field under the influence of aerodynamic drag, inertia and gravity forces. The particles may be liquid droplets, paint droplets, solid stone representations, or other physical representations. An equation governing the trajectory of a particle of mass m, in a flow field and in the presence of gravity, g, is given by $$m\underline{X}''=mg-\tfrac{1}{2}\rho A C_d |\underline{X}'-\underline{V}|(\underline{X}'-\underline{V}) \qquad (1)$$

where X is distance, the primes indicate derivative of the distance with respect to time, e.g., X' is velocity and X" is acceleration, V is the velocity of the flow field, and the underbar denotes a vector quantity. Also, $\rho$ is the density of air, A is the cross-sectional area of a particle which is typically modeled as a shere, and $C_d$ is the coefficient of drag. The details of the breakup of the liquid jet into droplets and surface tension effects are not included in the equation (1) as negligible, but those skilled in the art will understand that such may be included if desired. If these particles are assumed to be spherical droplets with mass density $\rho_{liquid}$ and diameter d, we can rewrite the above equation as follows:

$$\underline{X}''=g-\lambda(\underline{X}'-\underline{V}) \qquad (2)$$

where $\lambda=\tfrac{3}{4} C_d |\underline{X}'\underline{V}|/(\rho_{liquid} d)$. The coefficient of drag varies depending on the relative velocity of the droplet with respect to the flow field velocity vector, V. This relative velocity is simply the vector X'-V. Accurate experimental data on the drag coefficient of spheres for a wide range of Reynolds numbers is known, and preferably a lookup table from these experimental values is constructed and the method and system of the present invention calculates the drag coefficient at each timestep from this table, with the Reynolds number based on the relative velocity. Given an initial location in the flow field and a velocity thereat, equation (2) can be integrated, preferably using a 4th order Runge-Kutta scheme, to obtain a particle trajectory. The initial location is specified in box 16 of FIG. 1 by locating the particle injector, and the initial velocity is specified in box 18. Other trajectory computations can be used to obtain the particle trajectories of the present invention.

Figure 2:
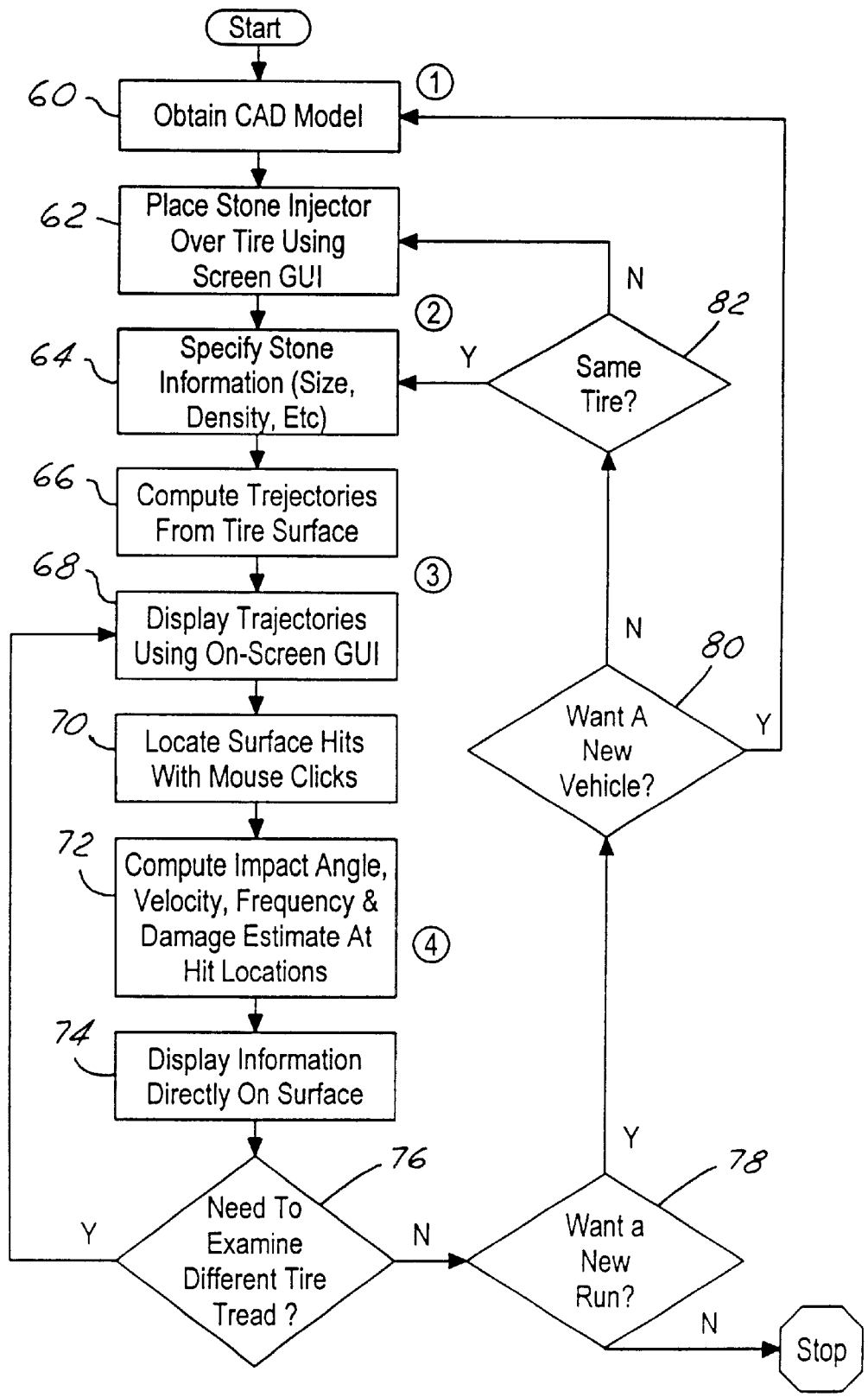
FIG. 2 is a flowchart of a method to aid in designing an automotive vehicle using particle trajectory analysis to determine stone and debris trajectory and impact location along bottom surfaces of a vehicle exterior according to an embodiment of the present invention.
Figure 3:
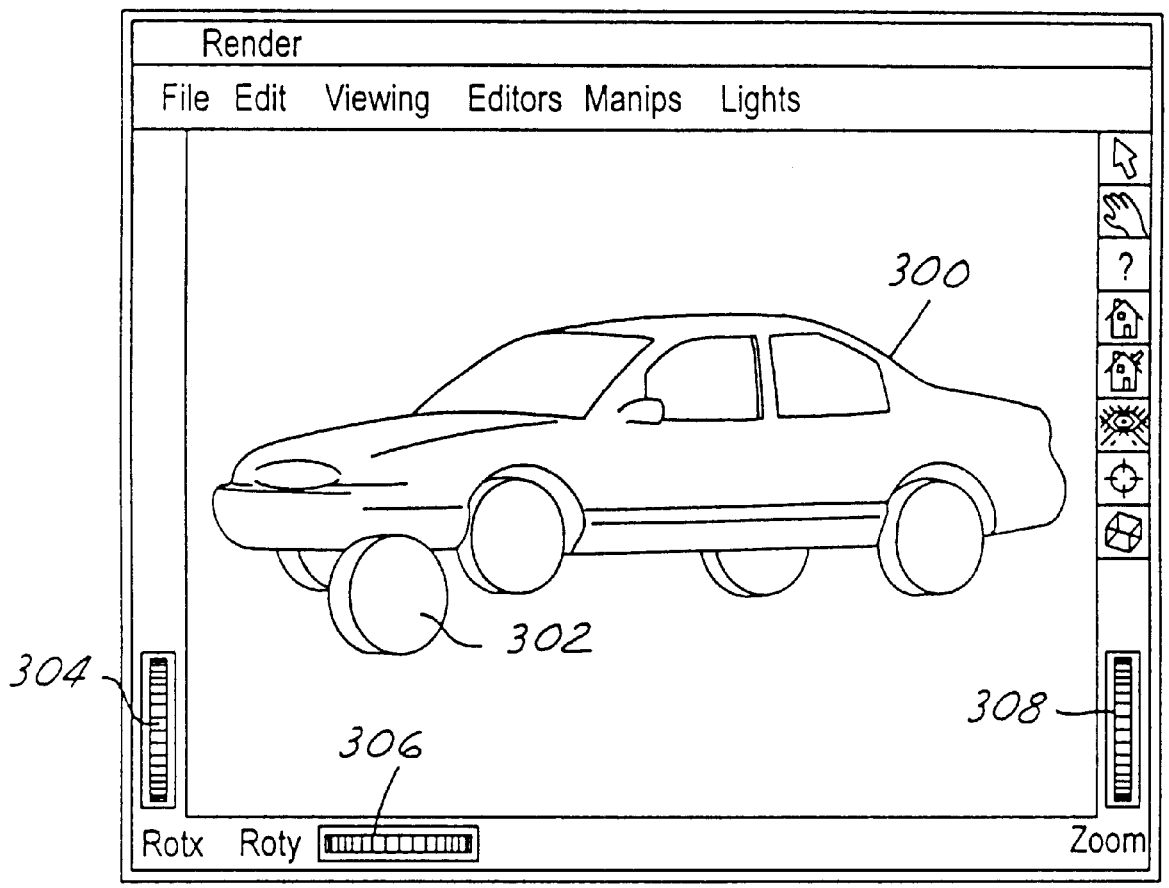
FIG. 3 is screen view of a CAD vehicle model and an injector tire for use with a preferred embodiment of the present invention.
Figure 4:
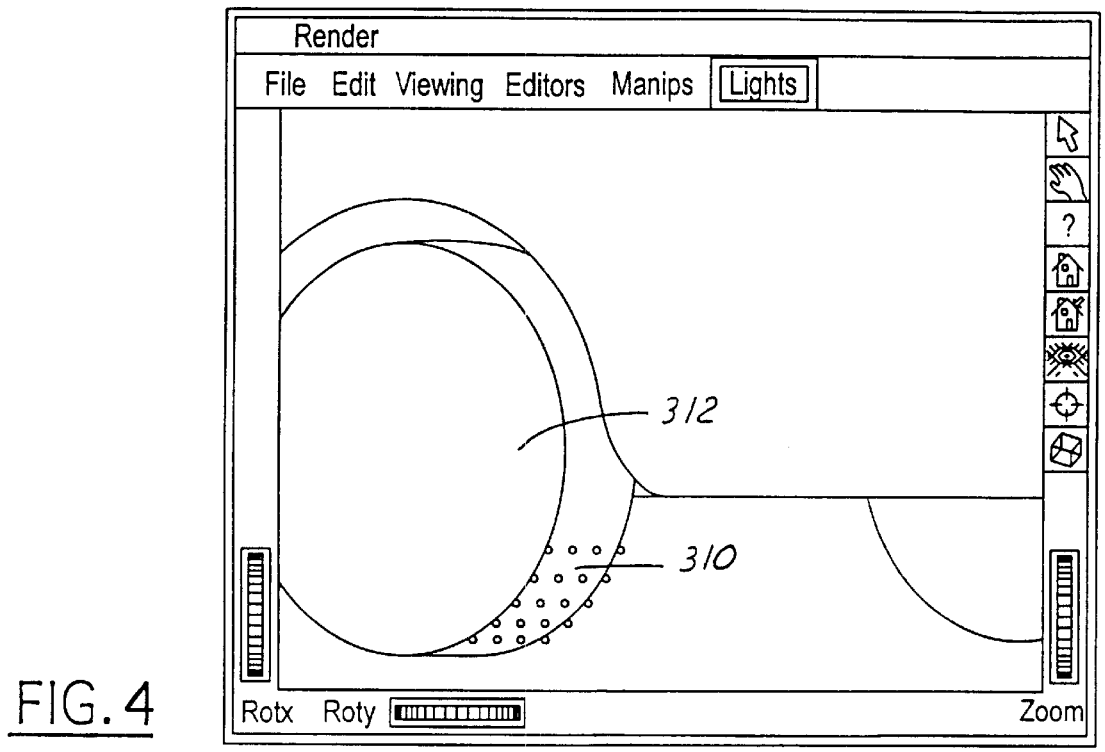
FIG. 4 is a screen view showing a tire injection patch located on a vehicle tire.

Referring now to FIG. 2, a method for a second embodiment according to the present invention for enabling dynamic placement of a stone injection patch onto a vehicle tire of a CAD model to permit visual observation of stone trajectories with respect to the CAD model is shown. In box 60, a CAD model of the vehicle is obtained as described above, which is preferably rendered on a display screen such as seen in FIG. 2. The CAD model 300 may include the whole vehicle or a desired portion thereof, and will typically include at a minimum a vehicle's quarter panels and side panels in addition to vehicle tires. An injector tire 302 may also be imported. As is known in the art, various views of the CAD model 300 may be obtained by rotating it about various axes, for example using the dials 304, 306 adjacent the screen, and distant views may be obtained by using the zoom dial 308 (FIG. 3). One such view is shown in FIG. 4 where a stone injector patch 310 is placed onto the tread surface of a tire 312. For purposes of this disclosure, a stone injector patch is a designated surface area of the tread portion of a vehicle tire from which particles, such as stones, are simulated to be ejected due in part to the rotational motion of the tire. It should be understood that particles other than stones may be simulated, such as mud, dirt, and other road or environmental debris. Thus, this embodiment of the present invention provides users with a tool that can predict soil deposition in the form of dirt streaking along the bottom sides of a vehicle caused by soil thrown from the tires.

Figure 5:
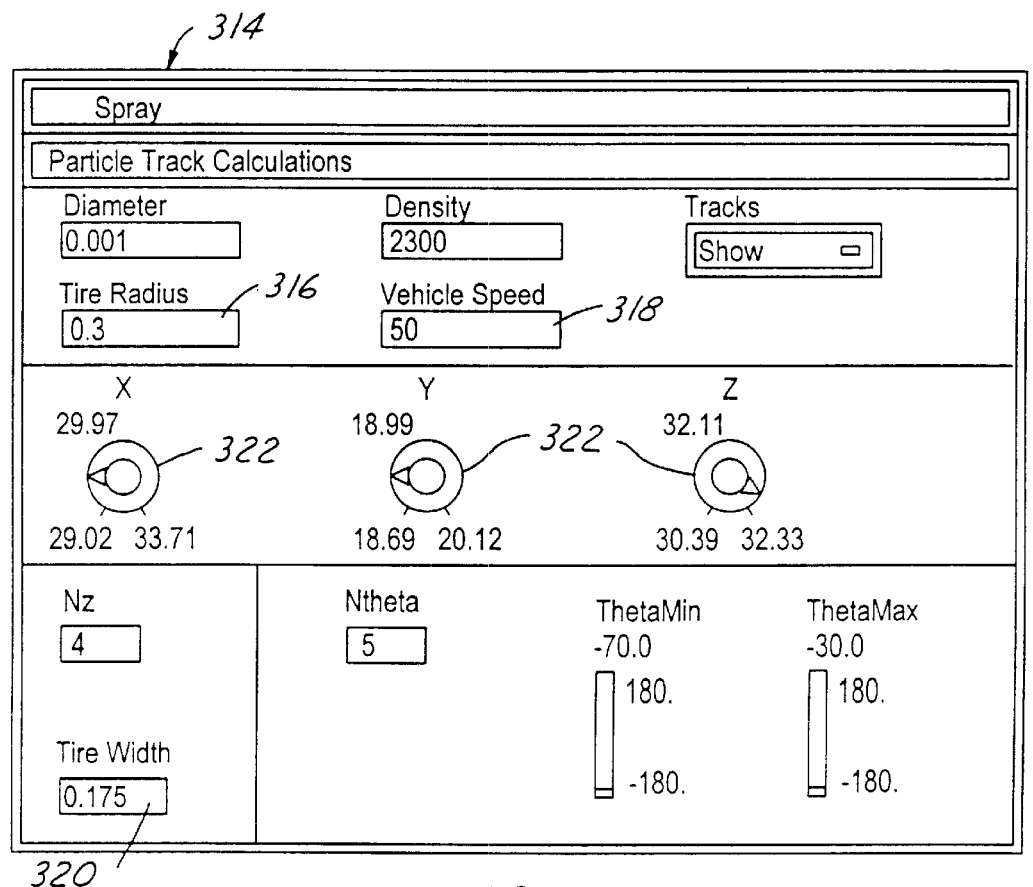
FIG. 5 is a screen view of a dialog window for selecting stone and tire characteristics and for reviewing stone impact information.

Returning to FIG. 2, placement of the stone injector over the tire is preferably accomplished using an on-screen GUI, which a user may manipulate with an input device such as a mouse (box 62, FIG. 2). In addition, various characteristics of the tire injection patch may be specified using injection patch dialog box 314 (FIG. 4), including tire radius 316, vehicle speed 318, tire width 320. The tire location may be adjusted using the coordinate dials 322 and the tire angular orientation with respect to the longitudinal direction may also be adjusted by changing the yaw angles (Nz and Ntheta), as seen in FIG. 5.

Figure 6:
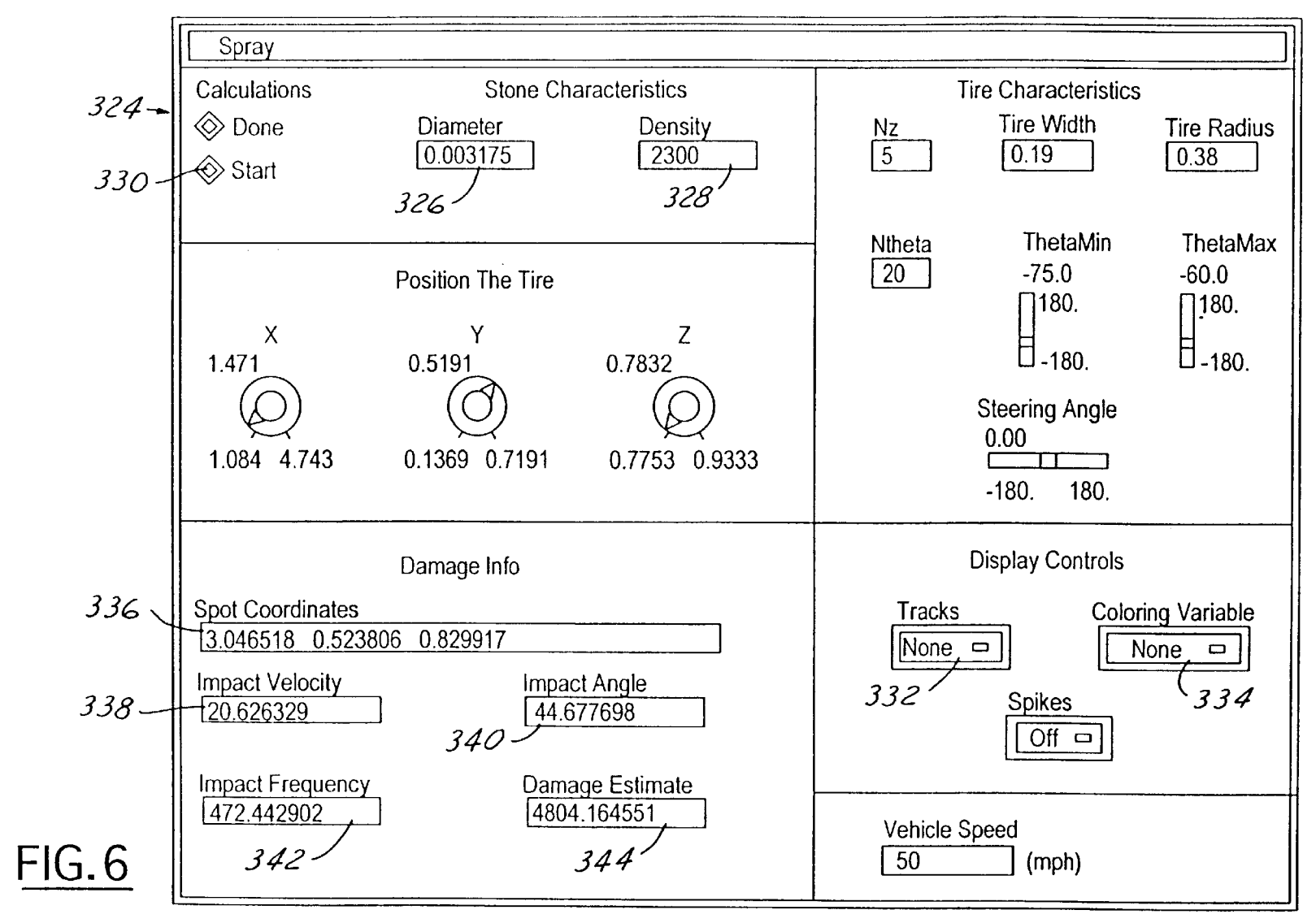
Figure 7:
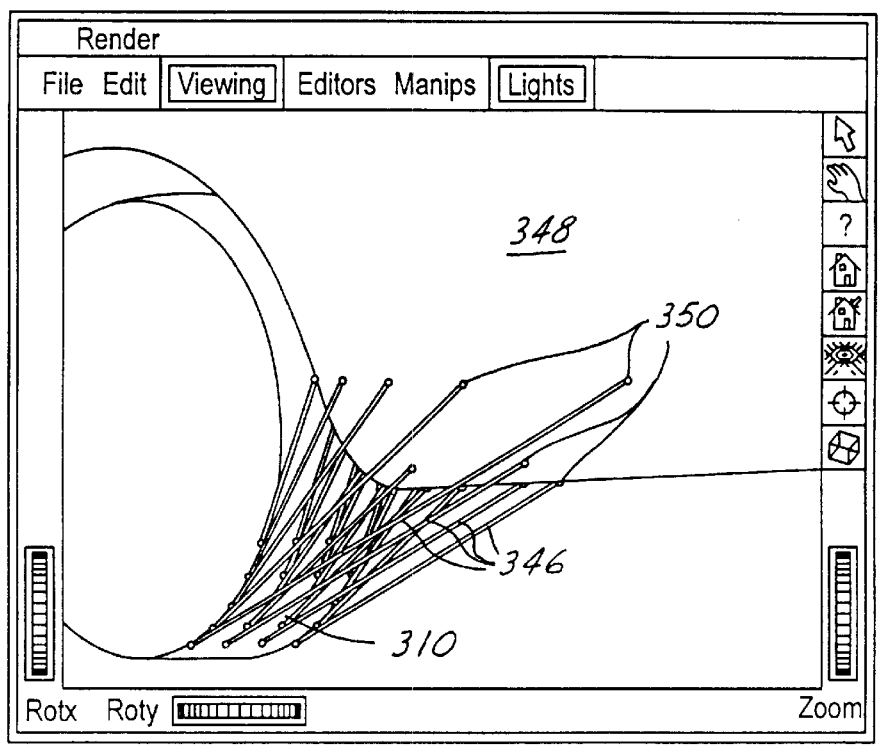
FIG. 7 is a screen view showing stone trajectories from a vehicle tire and resulting impact locations on a vehicle exterior surface.
Figure 8:
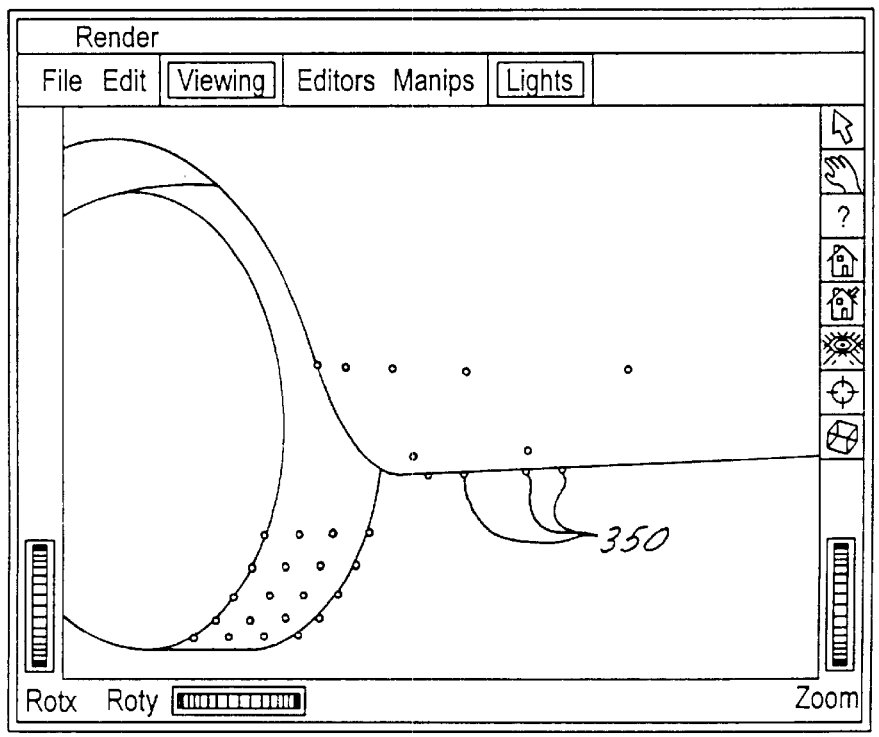
FIG. 8 is a screen view similar to FIG. 7 but showing only impact points on the vehicle exterior surface.

Stone information is specified in box 64 (FIG. 2) through the main dialog window 324 (FIG. 6), such as stone diameter and stone density being ejected from the tire patch, as seen in boxes 326 and 328, respectively. Such information may also be input in the tire injection patch window 314 (FIG. 5). After the stone information has been specified and the stone injector patch placed in a desired location in the tire, trajectory calculations may be performed (box 66, FIG. 2) by pressing a start button 330 in the main dialog box 324 (FIG. 6). A user may select various display options, such as displaying the trajectories (button 332, FIG. 6) or varying the colors of the trajectories (button 334, FIG. 6). After the trajectories are computed (box 66, FIG. 2) and displayed, for example using an on-screen GUI (box 68, FIG. 2), surface hits of the stones are located with the mouse by clicking at an impingement spot which locates the coordinates thereof and such information is displayed in the main dialog box 324 at the spot coordinates box 336 (FIG. 6). When a spot has been located (box 70, FIG. 2) damage estimate information at that location is computed (box 72, FIG. 2) such as impact velocity, impact angle, impact frequency, and a damage estimate, and such information is displayed in the main dialog box 324 (FIG. 6) in dialog boxes 338, 340, 342, 344, respectively. In addition to displaying such damage information on the main dialog box 324, the damage information may also be directly displayed (not shown) on the vehicle surface (box 74, FIG. 2). As seen in FIG. 7, the stone trajectories 346 from the tire patch 310 to the vehicle surface 348, along with the surface hits 350, may be displayed. Preferably, the stone trajectories and the points of impact with the vehicle surface have different colors. Alternatively, impact points 350 may be displayed without showing the trajectories (FIG. 8), and preferably the color of an impact point will vary according to damage, impact angle, or impact frequency.

In diamond 76, if a different tread is sought to be evaluated, flow is routed to box 68 after new tread information is input into main dialog box 324 under the tire characteristics section (FIG. 6). If a different tread is not desired, then flow is routed to position diamond 78 in which a user is asked if a new run is desired. If not, the program ends. However, if a new run is desired, flow is routed to decision diamonds 80 in which the user decides whether a new vehicle is desired. If so, flow is routed to box 60 in which a new CAD vehicle model is obtained. If, however, the user does not want to use a new vehicle, then flow is routed to decision diamond 82 in which the user is requested whether a new tire is desired. If not, flow is routed to box 62 at which time a new stone injector patch is placed over the tire as described above. However, if the user desires to use the same tire, then flow is routed to box 64 in which stone information is specified as described above. In all of the above circumstances in which a new run is desired, flow is routed through the subsequent boxes shown by the arrows in FIG. 2.

Figure 9:
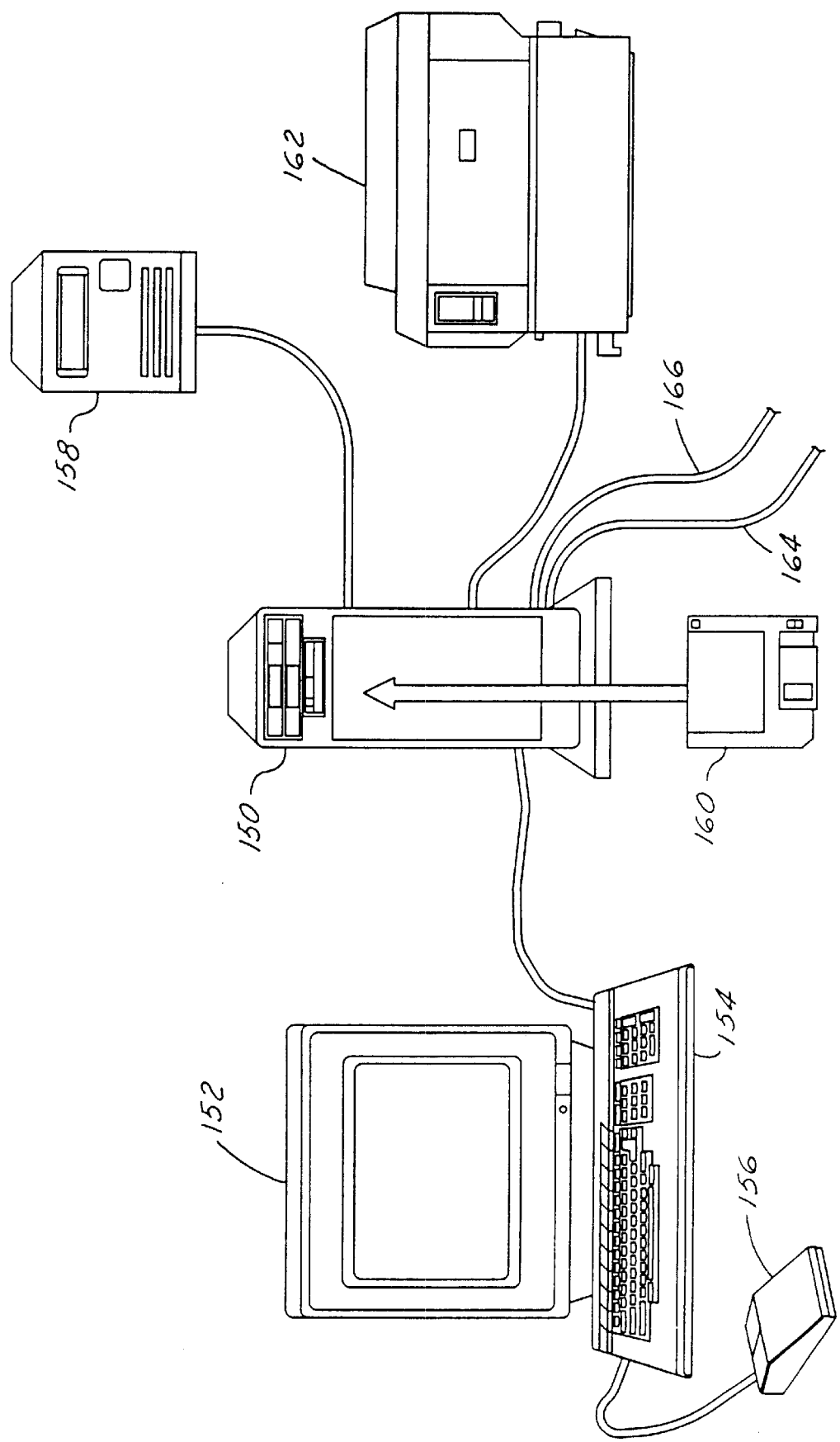
FIG. 9 is a perspective view of a system according to the present invention.

A representative computer system for the trajectory analysis method and system according to the present invention is depicted in FIG. 9. The system includes a processing unit 150 connected to a user interface which may include a display terminal 152, a keyboard 154, a pointing device, such as a mouse, 156, and the like. The processing unit 150 preferably includes a central processing unit, a memory, and stored instructions which implement a method to assist in vehicle design according to the present invention. The stored instructions may be stored within the processing unit 150 in the memory, or in any non-volatile storage such as magnetic or optical media, EPROM, EEPROM, or the like. Alternatively, instructions may be loaded from removal magnetic media 160, such as a removal disk, sometimes called a floppy disk, optical media 158, or the like. In a preferred embodiment, the system includes a general purpose computer program to implement the functions illustrated and described with reference to FIGS. 1–8. Of course, a system according to the present invention could also be embodied with a dedicated device which includes various combinations of hardware and software. The preferred embodiment may also include a printer 162 connected to the processing unit 150, as well as a network connection for accessing a local server, an intranet 164, and the Internet 166.

In a preferred embodiment, the present invention includes an arithmetic logic circuit configured to retrieve information from a specific file, display that information in a form of a vehicle design on a display screen, compute particle trajectories relative to the vehicle design based on specific input, display the trajectories relative to the vehicle design, and allow the user to modify the specific input in order to produce trajectories which meet the desired design criteria.

Although the preferred embodiment of the present invention has been disclosed, various changes and modifications may be made without departing from the scope of the invention as set forth in the appended claims.

What is claimed is:

1. A system for designing an automotive vehicle by enabling dynamic placement of particle injection points relative to a vehicle surface to permit visual observation and alteration of resulting particle trajectories over a computer aided design (CAD) model representative of a desired portion of the vehicle represented on a display means by a computer having memory means, processor means and user input means associated therewith, the system comprising:

particle injector placement code means operable with the user input means to dynamically effect a desired placement of at least one particle injector on the display means with respect to the desired portion of the CAD model;

trajectory determination code means for computing at least one trajectory for a particle stream emanating from the at least one particle injector relative to the desired portion of the CAD model for user inputable information describing the physical particle characteristics in a predetermined set of particle external conditions;

trajectory display code means for effecting display of the at least one trajectory with respect to the desired portion of the CAD model; and a damage analysis means for estimating damage caused by the impact of the particle stream at a user-selected location of the vehicle and for displaying information representative of the estimated damage.

2. The system of claim 1 wherein the particle injector placement code means includes GUI means for displaying a particle injector GUI on the display means, the GUI means operative with the input means for locating the desired placement of the at least one particle injector.

3. The system of claim 1 wherein the predetermined set of particle characteristics includes at least one of a set of particle diameter data, particle density data, and particle initial velocity data.

4. The system of claim 1 wherein the trajectory display code means includes code means for displaying coordinate information on the display means relative to the CAD model for intersection of the at least one trajectory with the desired portion of the vehicle.

5. The system of claim 1 wherein the particle injector placement code means includes stone injector code means for simulating ejection of particles from a predetermined tire patch of a tire of the CAD vehicle.

6. The system of claim 5 wherein the trajectory determination code means includes ejected stone code means for determining a set of data representing particle impact data including at least one of a set of impact angle, a set of impact velocity data, a set of impact frequency data, and set of impact damage estimate data for each of a set of stone particles ejected by the particle injector from the tire patch, and wherein the particle impact data is utilized by the damage analysis means to estimate damage caused by the ejected particles at the user-selected location of the vehicle.

7. The system of claim 6 wherein the trajectory display code means includes ejected stone display means for displaying at least one item of the set of particle impact data on the display means, including particle impact points at the user-selected location of vehicle, and wherein the damage analysis means is effective to vary the color of displayed impact points based upon the estimated damage at the impact points.

8. The system of claim 1 wherein the particle injector placement code means includes soil deposition code means for simulating ejection of soil particles from a predetermined tire patch of a tire of the CAD vehicle.

9. The system of claim 8 wherein the trajectory determination code means includes soil deposition pattern code means for determining a set of data representing soil deposition data including at least one of a set of soil impact angle data, a set of soil spray diffusion data, and a set of soil impact frequency data for each of a set of soil deposition streams ejected by the particle injector from the tire patch.

10. The system of claim 9 wherein the trajectory display code means includes soil deposition display means for displaying at least one item of the set of soil deposition data on the display means relative to the desired portion of the CAD model.

11. A method for designing an automotive vehicle using particle trajectory analysis with a computer aided design (CAD) model representative of the vehicle, the method comprising the steps of:

preparing a CAD model of a desired portion of the vehicle;

placing a particle injector at a desired location with respect to the desired portion of the vehicle;

specifying particle information describing the physical characteristics of particles to be ejected from the particle injector;

computing a trajectory for a particle stream emanating from the particle injector;

displaying the trajectory relative to the desired portion of the vehicle on a display means to permit visual observation thereof;

determining points on a surface of the vehicle that are impacted by the particle stream;

calculating damage information relating to the impact of the particle stream on the surface of the vehicle;

displaying the calculated damage information; and repositioning the particle injector if necessary to achieve a desired trajectory.

12. A method for designing an automotive vehicle by enabling dynamic placement of particle injection points into a flow domain to permit visual observation and alteration of resulting particle trajectories with respect to a computer aided design (CAD) model representative of the vehicle, the method of comprising the steps of:

storing a first set of data representing a CAD model of a desired portion to the vehicle into a computer memory;

displaying the first set of data on a video display screen;

placing at least one particle injector at a desired location with respect to the desired portion of the vehicle by storing a second set of data representing the at least one particle injector in the computer memory;

storing a third set of data in the computer memory representing particle information describing the physical characteristics of the particles to be ejected from the particle injector;

computing a fourth set of data representing a stationary trajectory for a particle stream emanating from the particle injector using the first, second and third sets of data;

displaying the fourth set of data representing a trajectory relative to the first set of data representing a desired portion of the vehicle on the video display screen to permit visual observation thereof;

computing a fifth set of data representing particle impact data describing particle impact points and attributes at a user-selected location on a surface of the vehicle;

utilizing the fifth said of data to estimate damage to the user-selected location on the surface of the vehicle;

displaying damage information describing the estimated damaged to the user-selected location on the surface of the vehicle; and dynamically repositioning the particle injector if necessary to achieve a desired trajectory by manipulating the second set of data in the computer memory.

13. The method of claim 12 wherein the third set of data representing particle information includes at least one of a set of particle diameter data, particle density data, and particle initial velocity data.

14. The method of claim 12 and further including the step of displaying coordinate information on the video display screen relative to the CAD model for intersection of the trajectory with the desired portion of the vehicle.

15. The method of claim 12 wherein particle injector is placed in the desired location using a screen GUI displayed on the display means.

16. The method of claim 12 wherein the second set of data represents a stone injector for simulating ejection of particles from a predetermined tire patch of a tire of the CAD vehicle.

17. The method of claim 12 wherein the damage information is directly displayed on the surface of the vehicle.

18. The method of claim 17 wherein the damage information displayed includes particle impact points which vary in color according to the estimated damage at the impact points.

19. The method of claim 12 wherein the second set of data represents a soil deposition injector for simulating ejection of particles from a predetermined tire patch of a tire of the CAD vehicle.

20. The method of claim 19 including the step of computing a fifth set of data representing particle impact data including at least one of a set of soil impact angle data, a set of soil spray diffusion data, and a set of soil impact frequency data for each of a set of soil deposition streams ejected by the particle injector from the tire patch.

* * * * *